Jan. 18, 1927.                                                          1,615,158
                              A. BERGQUIST
              APPARATUS FOR EXTRACTING HONEY FROM THE COMB
                      Filed Sept. 15, 1924      2 Sheets-Sheet 1

Arthur Bergquist,
INVENTOR

BY Victor J. Evans,
ATTORNEY

WITNESS:

Jan. 18, 1927.
A. BERGQUIST
1,615,158
APPARATUS FOR EXTRACTING HONEY FROM THE COMB
Filed Sept. 15, 1924     2 Sheets-Sheet 2
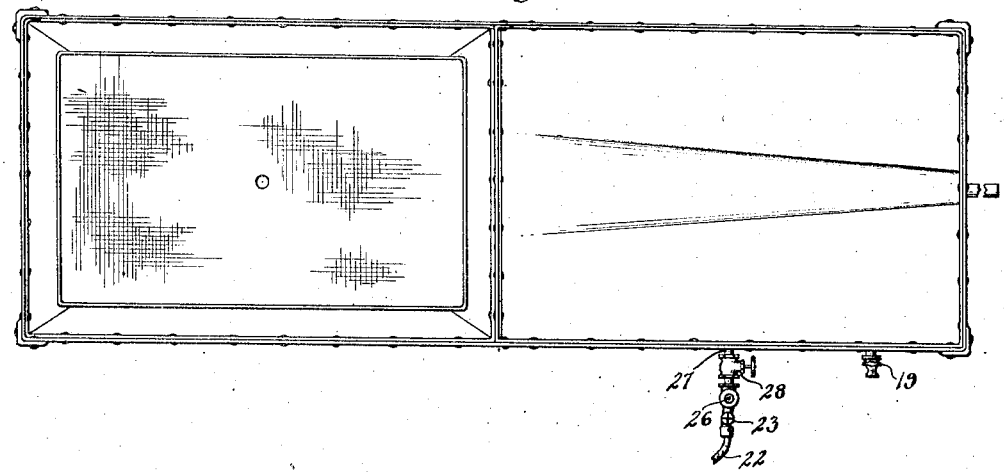
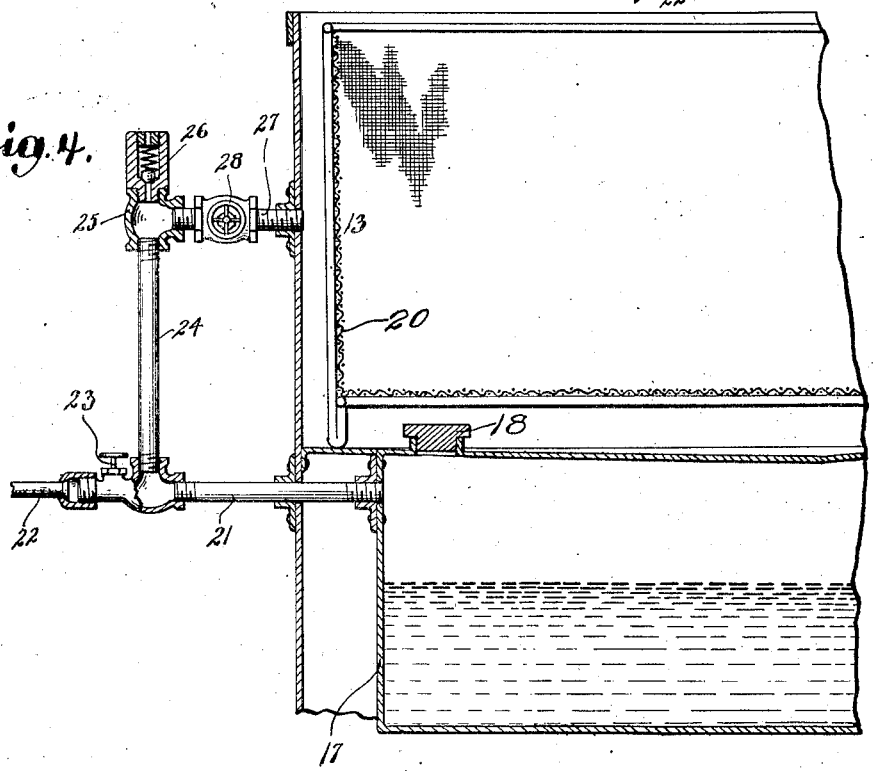
Arthur Bergquist.
INVENTOR
BY Victor J. Evans,
ATTORNEY Patented Jan. 18, 1927.

1,615,158

UNITED STATES PATENT OFFICE.

ARTHUR BERGQUIST, OF LINDSTROM, MINNESOTA.

APPARATUS FOR EXTRACTING HONEY FROM THE COMB.

Application filed September 15, 1924. Serial No. 737,890.

This invention contemplates the provision of an apparatus designed for handling honey-combs to facilitate the extracting of the honey therefrom, and the melting of the wax for which steam is generated and admitted to one of the compartments of the apparatus, the invention residing in the construction, combination and arrangement of parts as claimed.

In the drawings forming part of this application, like numerals of reference indicate similar parts in the several views, and wherein:

Figure 3 is a top plan view.

Figure 4 is an enlarged fragmentary view partly in section showing how the steam is conveyed to the compartment in which the wax is melted.

Figure 1:
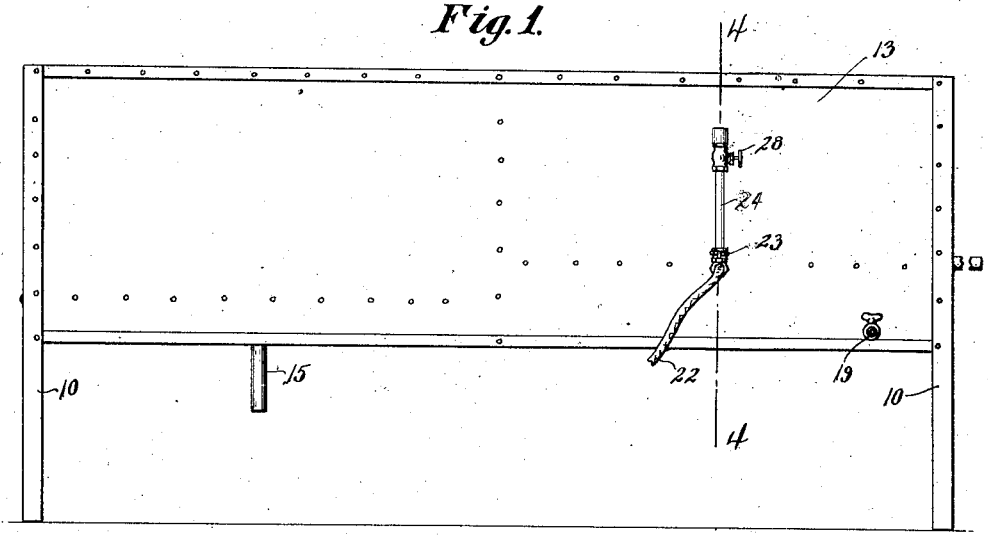
Figure 1 is a side elevation of the apparatus forming the subject matter of the invention.
Figure 2:
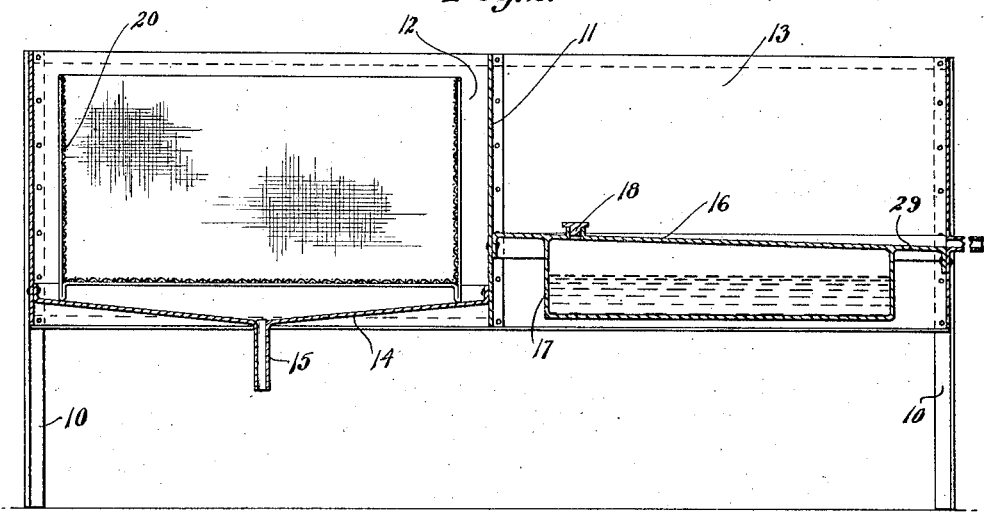
Figure 2 is a longitudinal sectional view therethrough.

The apparatus forming the subject matter of the invention comprises a tank which is supported by legs 10 arranged at the corners thereof, the tank being divided by a partition 11 into separate compartments indicated at 12 and 13 respectively. The bottom 14 of the compartment 12 inclines towards the center and has an opening arranged centrally thereof which communicates with a drain pipe 15. The bottom 16 of the compartment 13 is arranged considerably higher than the bottom 14 of the compartment 12, to provide space beneath the bottom for a water container 17 which is closed by the bottom 16 of the compartment 13 as shown. The container 17 is provided with a filling opening which is normally closed by a plug 18, as well as a water gauge indicated at 19. Arranged within the compartment 12 is a basket 20 constructed of wire of any suitable mesh, which basket is adapted to receive the cappings from the comb, holding the cappings to allow the honey to drain therefrom and pass through the drain pipe 15 into a suitable receptacle adapted to be arranged beneath the apparatus.

The water in the container 17 is adapted to be heated by a suitable stove or oil burner not shown, but adapted to be arranged beneath said container, and the steam generated thereby is utilized to heat the capping knife not shown and also to melt the cappings after the basket 20 has been transferred from the compartment 12 to the compartment 13.

As shown in Figure 4 a steam outlet pipe 21 leads from the water container 17, and coupled to the outer end of this pipe is a hose 22 which conveys steam to the capping knife not shown, as this feature does not form any part of the present invention. Interposed between the pipe 21 and the hose 22 is a valve 23 by means of which the flow of steam to the hose 22 can be cut off when desired. Rising from the pipe 21 is a pipe 24 which is associated with a coupling 25 having a spring pressed safety valve 26 arranged therein, the coupling being associated with a pipe 27 which establishes communication between the pipe 24 and the compartment 13 of said tank. A valve 28 is arranged in the pipe 27, which valve is closed when it is desired to prevent steam from entering the compartment 13.

In practice, the honey-comb is supported above the receptacle 20 and the cappings when severed from the comb fall into the receptacle 20, which is now arranged in the compartment 12. The comb is then placed within the compartment 13 above the water container 17, to be heated, thus making extracting easier as will be readily understood. However while the comb is arranged within the compartment 13, steam is not admitted thereto, as the valve 28 remains closed. After all the honey has drained from the cappings in the basket 20, the latter is transferred from the compartment 12 into the compartment 13, from which the comb has now been removed, and the valve 28 opened to permit the steam generated in the tank and the container 17 to flow through the pipe arrangement above described into the compartment 13. This of course quickly melts the wax of the cappings and runs through the outlet trough 29 through one end of the tank into a suitable container not shown, but which is adapted to be arranged directly beneath this trough as will be readily understood.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

An apparatus of the character described comprising a tank having a bottom inclined toward one end, a water container supported by said bottom and forming an integral part thereof, said bottom having an opening directly above the water container, a plug normally closing said opening, spaced parallel pipes projecting from the corresponding ends of the tank and water container respectively, a vertical pipe establishing communication between the aforementioned pipes, whereby steam is conveyed from the container into said tank, valves controlling said communication, and a wire basket adapted to be supported in said tank with its bottom in spaced relation to the bottom of said tank.

In testimony whereof I affix my signature.

ARTHUR BERGQUIST.